No. 883,151. PATENTED MAR. 24, 1908.
C. W. SPARKS.
CORN PLANTER.
APPLICATION FILED DEC. 20, 1907.
4 SHEETS—SHEET 2.
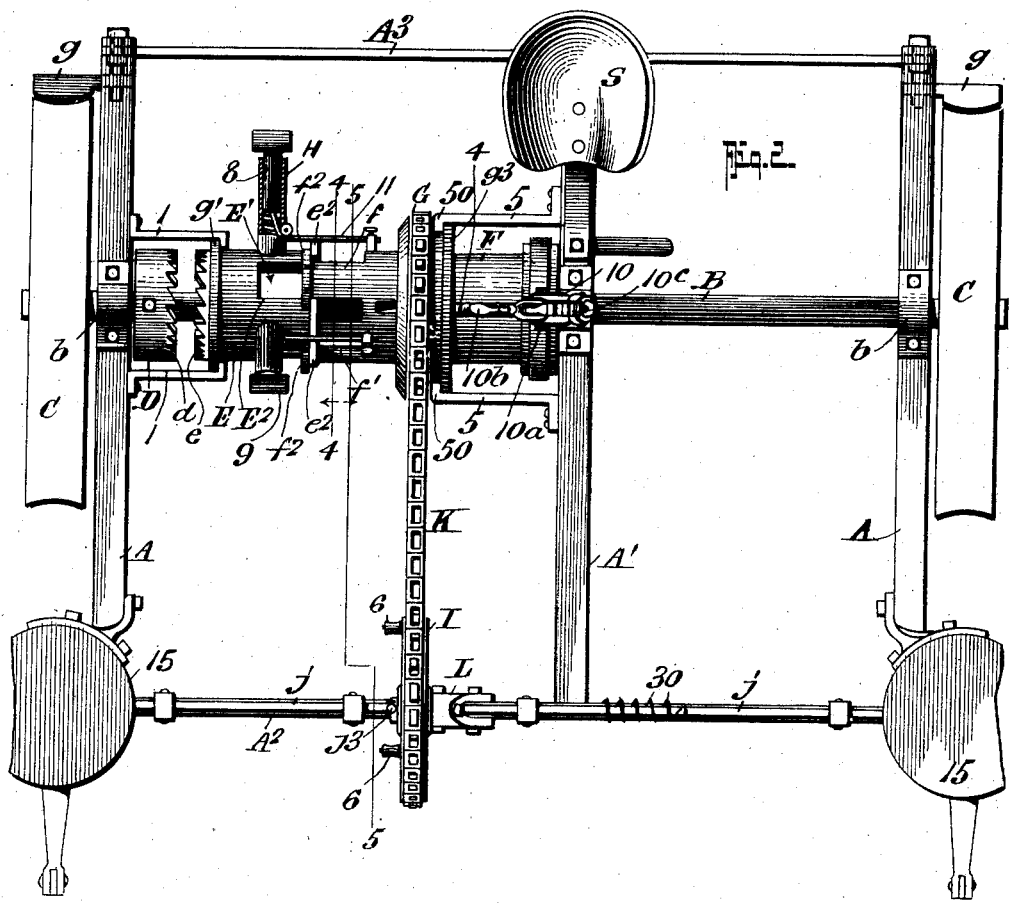
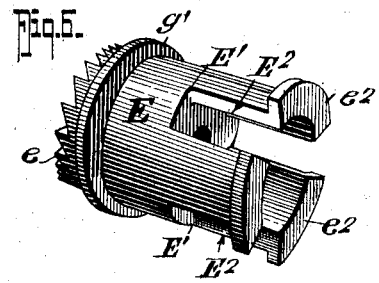
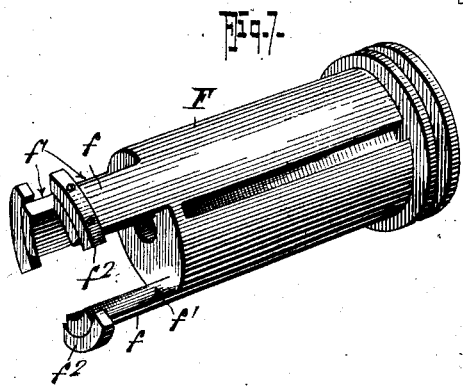
WITNESSES:
INVENTOR
Charles W. Sparks.
BY
Fred G. Dieterich
ATTORNEYS

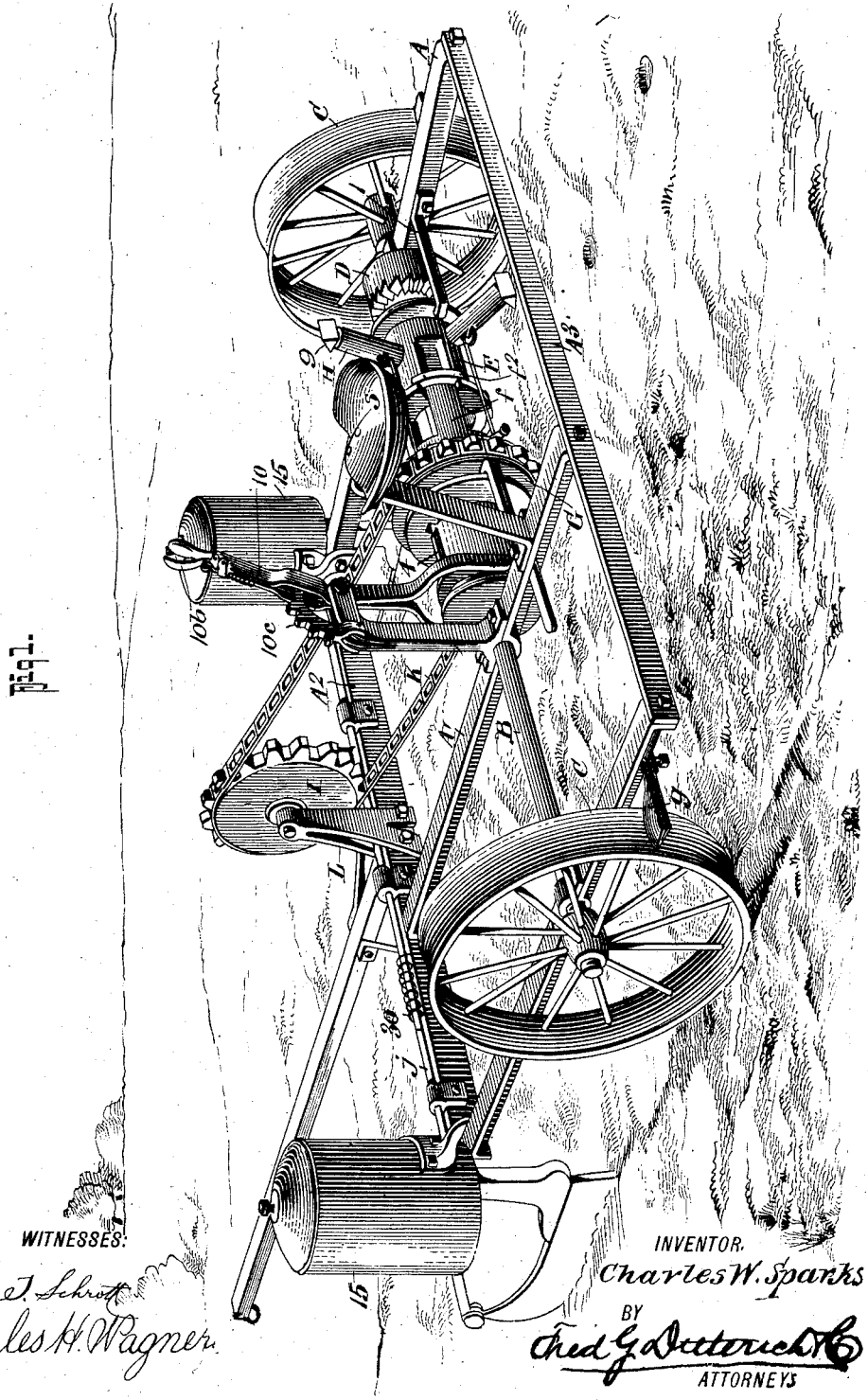

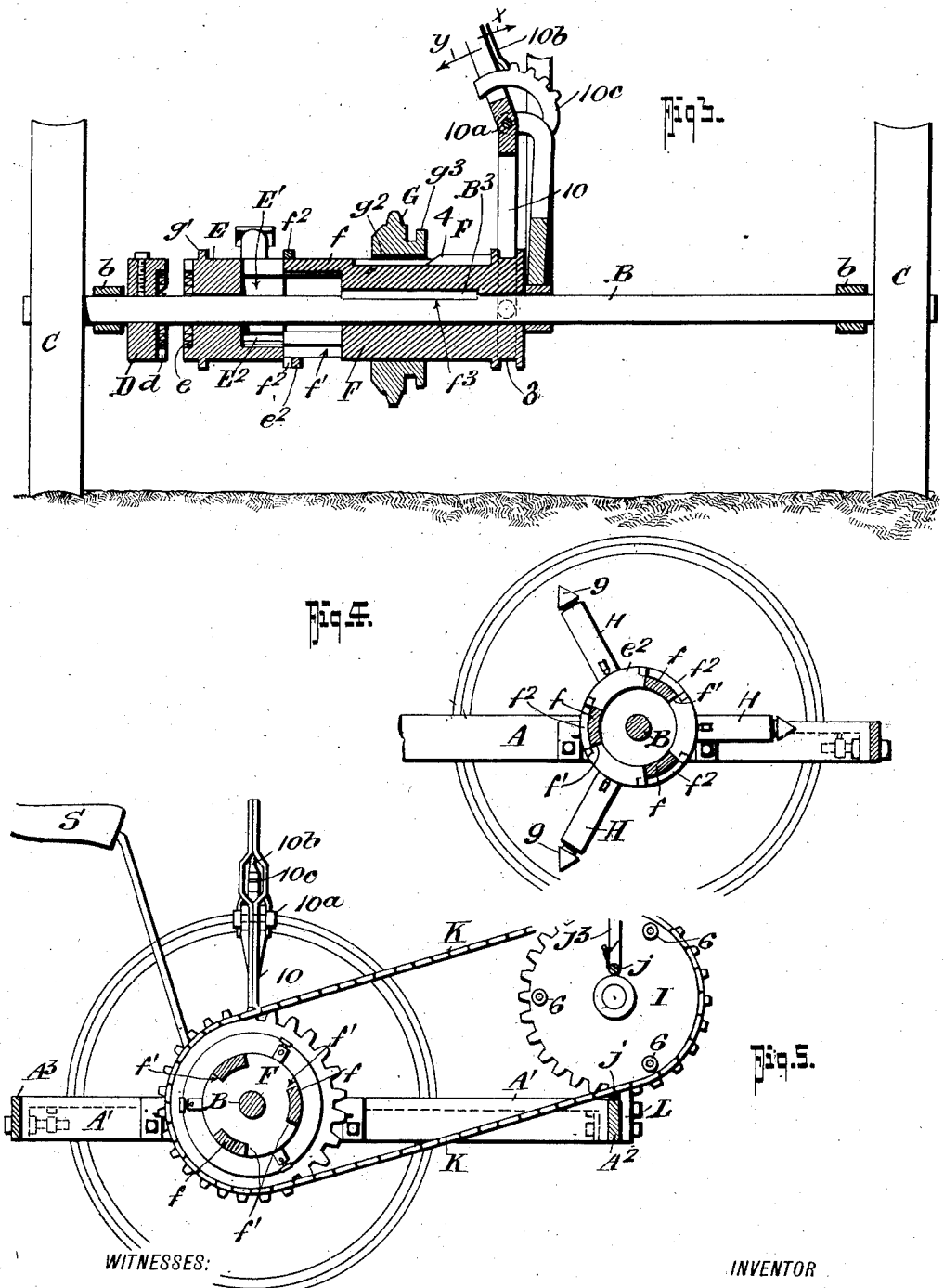

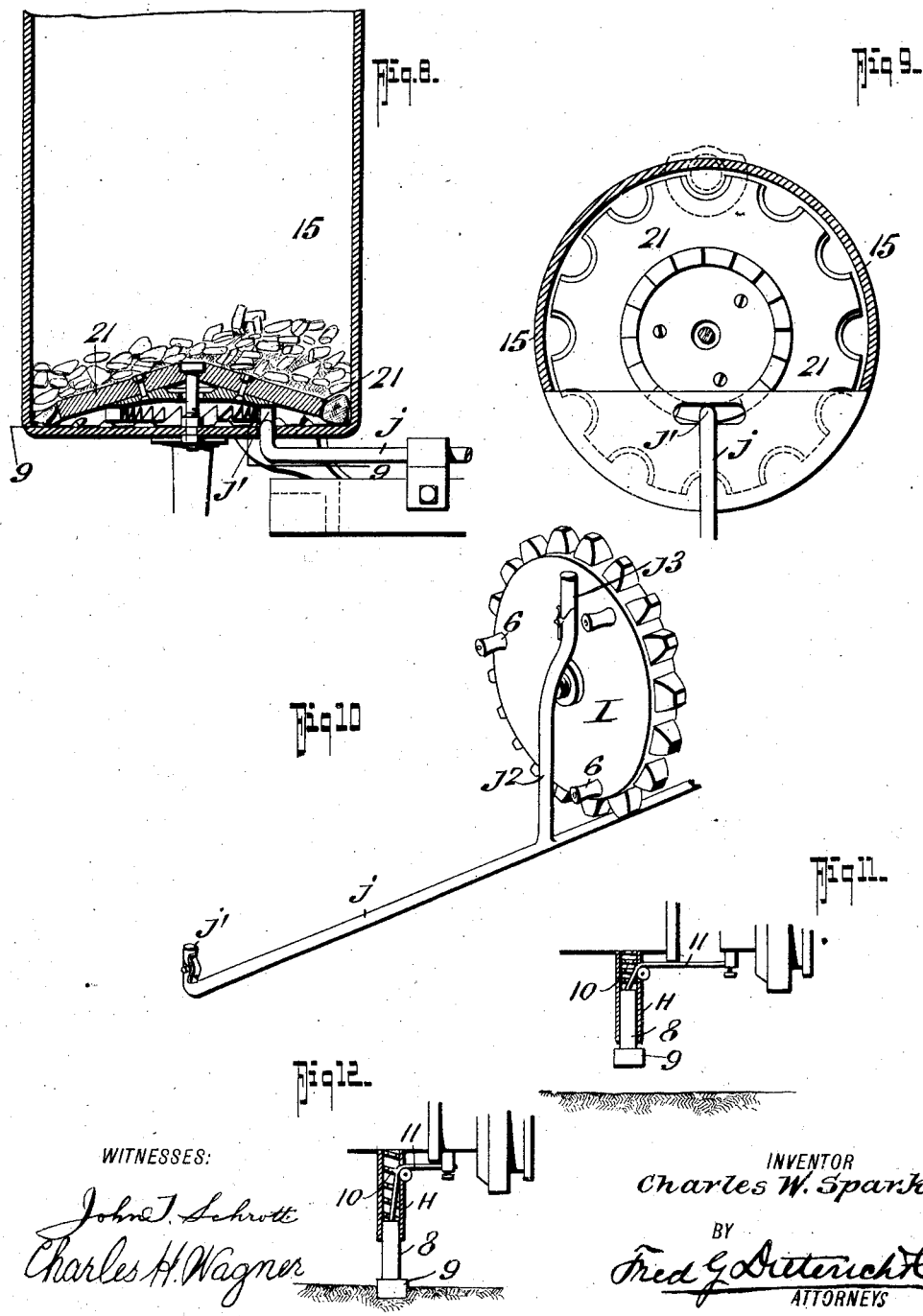

UNITED STATES PATENT OFFICE.

CHARLES W. SPARKS, OF CHERRYVALE, KANSAS, ASSIGNOR OF ONE-HALF TO J. W. SPARKS, OF THAYER, KANSAS.

CORN-PLANTER.

No. 883,151.  Specification of Letters Patent.  Patented March 24, 1908.

Application filed December 20, 1907. Serial No. 407,383.

*To all whom it may concern:*

Be it known that I, CHARLES W. SPARKS, residing at Cherryvale, in the county of Montgomery and State of Kansas, have invented a new and Improved Corn-Planter, of which the following is a specification.

This invention is in the nature of an automatic actuated wireless check row corn planter and it primarily has for its object to provide a machine of the character stated, of a simple, and economical construction, in which the means for intermittently actuating the corn dropping members is arranged for being conveniently dropped and set from the driver's seat and in such manner that the seed droppers actuating rod may be instantly thrown into or out of operative position and the said actuated means combined with the wheel carrying shaft so as to impart to the said dropping plates a definite amount of rotation or movement under each action of the check row mechanism.

In its generic nature, my invention comprehends a new and improved arrangement of clutch mechanism that is mounted on the wheel shaft or axle, which operates with the supplemental or seed plate actuating shaft, and in such manner that an oscillatory or partial rotation of the said supplemental shaft imparts the desired rotary motion or movement to the seed dropping devices.

In its more subordinate features, my present invention consists in certain details of construction and peculiar combination of parts, all of which will be hereinafter fully described, specifically pointed out in the appended claims and illustrated in the accompanying drawings in which:—

Figure 1, is a perspective view of my improved construction of corn planter. Fig. 2, is a plan view thereof. Fig. 3, is a transverse section of the same. Fig. 4, is a longitudinal section thereof, taken substantially on the line 4—4 of Fig. 2. Fig. 5, is a similar view taken on the line 5—5 of Fig. 2. Fig. 6, is a perspective view of the clutch member E. Fig. 7, is a similar view of the clutch member F. Fig. 8, is a transverse section of one of the seed boxes, its dropping mechanism, and the rocker shaft hereinafter referred to. Fig. 9, is a horizontal section taken on the line 9—9 of Fig. 8. Fig. 10, is a detail perspective view of a portion of my invention. Figs. 11 and 12 are detailed views of the marker devices that form a coöperative part of my complete invention.

In the practical application of my invention, the usual type of rectangular frame is provided and which comprises the side beams A—A, a central beam A' that extends rearwardly and parallel with the beams A—A, a front cross bar A² and a rear cross brace rod A³, the ends of which are connected to the side bars A—A, which bars carry at their ends adjustable scrapers $g$ for cleaning the traction wheels C—C, that are mounted upon the opposite ends of the axle or shaft B, the latter being loosely journaled in suitable boxes $b$—$b$ on the upper side of the side frame members as clearly shown in Figs. 1 and 2.

D designates a drum that is fixedly attached to shaft B near one end thereof and which has its inner end formed with ratchet teeth $d$ for clutching with similar teeth $e$ on a co-acting drum E which rotates with the shaft B, but is slidably mounted thereon so as to be moved into or out of engagement with the ratchet drum D as desired.

The drum E at its outer edge, has a flange $g'$ for limiting the endwise inward movement of the said drum E, it also having a flange $e^2$ at its inner end, the purpose of which will presently appear. The flange $g'$ engages brackets 1—1 that extend inwardly from the side frame member A as clearly shown in Fig. 2, by reference to which and to Figs. 6 and 7, it will be also noticed that the drum E, at its inner end, has 3 diametrically opposite slots E' E' having dove tail edges E² E² for receiving the oppositely disposed members $f$ that project from another drum F, also slidably mounted on the shaft B, the edges $f'$ of the members $f$ being properly shaped to engage the dove tail slots E² in the drum E.

The slots E', in practice, are about four or five inches long so as to give a desired free working play of the members $f$ in the slots E' E' for a purpose presently explained, and the ends of the members $f$, have flanges $f'$ for engaging with the flange $e^2$ on the outer end of the drum E as shown.

The drum F, slidably mounted on the shaft B as stated, has a long groove $f^3$ for coacting with the spline $B^3$ on the shaft B and it also has an annular groove 3 at one end for receiving the lower end of the lever 10 fulcrumed at $10^a$ and having its handle portion extended up to near the driver's seat S, see Fig. 1, for conveniently shifting the same, it being understood that when shifted to the position shown in full lines of Fig. 3, the drum F is at its innermost position and has pulled the drum E away from the drum D to disengage it, the said drum E being moved endwise by the flanges on the members $f$, engaging the flange $e^2$ when moved inwardly and the members $f$ that engage the inner ends of the slots $E^2$ when they are moved outwardly when the lever 10 is shifted in the direction indicated by the arrow $x$ on Fig. 3.

By providing the arms or members $f$, with flanges or lugs $f^2$ for engaging the flange $e^2$ on the drum E, provision is also made for preventing the members $f^2$ pulling out of the slots $E^2$ in the drum E. Drum F also has a long key or spline 4 that engages a longitudinal groove $g^2$ in a sprocket wheel G formed with an annularly groove hub $g^3$ on its inner side, with which engages the inturned edges 50—50 of the brackets 5—5 that are secured to the frame bar A' and the said brackets 5—5 serve to hold the sprocket wheel G for endwise movement on or with the drum F as the latter is shifted, it being understood that the said wheel always turns with the drum F when rotary motion is imparted thereto.

The lever 10 has the usual hand controlled pawl $10^b$ for engaging the rack $10^c$ that locks the lever to its adjusted position and suitably journaled on a bracket L and in a plane and above the front cross frame member is another wheel I, of the same diameter as the wheel G and thereby it receives motion through an endless sprocket chain K, the said wheel forming a dropper actuating wheel, since it has a plurality,—three being shown—of lateral roller bearing lugs or cams 6 that engage with and actuate at predetermined times, a rocker bar $j$ mounted on the front frame cross bar and whose opposite ends coöperate with the seed dropping mechanism in the seed boxes 15—15 that are mounted on the opposite ends of the said cross bar, as shown.

The dropping mechanism in the seed boxes may be of any of the approved types that are capable of being actuated step by step or intermittent motion imparted thereto, for example, as shown in Fig. 8, by reference to which it will be seen that at each end the rocker bar $j$ carries a member $j'$, that engages the dropper plates 21, rotatably mounted in the bottom of the seed hoppers and which have the usual seed holes, it being understood that as the bar $j$ is rocked the dropper plates are intermittently operated, step by step, for delivering the corn into the planter legs as shown.

While I have described generally a form of seed dropping mechanism it will be understood that I do not restrict myself to the form of dropping mechanism herein disclosed, since any form of such mechanism operable by the rocking motion of a shaft may be used.

The rocker bar J has a crank arm $j^2$ that is engaged by the lugs 6 on the wheel I and by which the said bar is rocked sufficiently to move the planter or dropping plates one hole or cup forward, it being understood that when thus actuated the crank arm $j^2$ is released, and it, with the bar $j$, is turned back to the normal position, which is accomplished by the spring 30, as is shown, or its equivalent.

The crank arm $j'$ has its contacting end $j^3$ hingedly connected and the spring held to its normal position, but the said end $j^3$ is capable of being turned backward without actuating the rod $j$, which occurs when the movement of the wheel I is reversed in getting the planter in position for starting.

The rocker shaft $j$ is an equivalent of the rocker shaft commonly used in all corn planters and it operates the dropping plates of the planter in the manner that the common wire check rower does, and I therefore make no claim generally on the rocker shaft and the seed dropping devices actuated thereby, since my invention comprehends the means described and shown for transmitting motion intermittently to the said rocker shaft.

My invention in its complete form also includes marker devices that interdependently coöperate with the sliding clutch drums E—F and which are so designed that they automatically assume operative and inoperative positions as the said clutch mechanisms is thrown into and out of connection.

A plurality of marker devices—preferably three as are shown—are used and all are of like construction and adapted for being set into and out of operation together, and each of the said devices comprises a hollow arm H radially projected from the drum E, in which works a piston 8, having a marker head 9 at the outer end that is normally held to its outermost position by a coiled spring 10.

To the piston 8 is connected a wire cable 11, that passes out through the hollow arm H near the drum E and extends over to and is clamped on the sleeve F, as clearly shown in Fig. 2.

By reason of the peculiar construction and combination of parts as shown and described, it is manifest that after the parts have been adjusted for planting, that by shifting the lever 10 in the direction of the arrow $y$ the drum F is slid inwardly and thereby draws the cable 11 with it out from the arm H which compresses the spring 10 and pulls the marker 9 back far enough to pass freely over the ground. As the drum F moves to its innermost position, the lugs or flanges on its member $f$ engage the flange $e^2$ on the drum E and pull it out of engagement with the clutch drum D that is fast upon the shaft B and thereby throws the dropper mechanism out of gear. By connecting the markers to the clutch and actuating mechanism in the manner shown and described, the said markers can all at the same time, be raised out of the ground far enough to permit one of the markers to be pulled around until it comes actually on a line with the planted rows, and this adjustment may be repeated at any time that the markers indicate a variation in the line of the row. The spring 10 also receives a strain on the marker pistons and thus providing yielding marker arms for overcoming shocks when striking hard obstructions.

In the practical construction of my planter to assure accuracy of alinement of rows, the several parts are relatively so proportioned that the desired distances between the rows are obtained.

Having thus described my invention, what I claim and desire to secure by Letters Patent, is:

1. The combination, in a machine of the character described, with the dropping bar $j$ rockably mounted on the framing, said bar having a crank arm flexible in one direction, a rotatable gear wheel having a lateral projection for engaging the said crank arm for rocking the bar $j$ when moving forwardly and for slipping over the said crank arm when moving backward, and drive mechanism mounted on the axle and geared with the said gear wheel for the purposes specified.

2. In a corn planter of the character described, the combination with the framing, the drive axle, the rotary gear wheel I having lateral projection mounted on the frame, and clutch controlled drive gearing that joins the said wheel with the axle; of the dropper bar $j$ rockably mounted on the frame in close relation to the wheel I, said bar $j$ having a crank arm flexible in one direction for coöperating with the lateral projection on the wheel I.

3. In a machine of the character described, the combination with the frame, the drive axle and the dropper shaft or rod, and means for intermittently actuating the said rod, said means comprising two sleeves loosely mounted on the axle, one of which has a clutch face, a clutch member fixedly mounted on the axle for engaging with the clutch sleeve, means for moving one sleeve independent of the other or both together, a marker mechanism set to its operative or inoperative position by the adjustment of the independently movable sleeve, a gear wheel rotatable with the independently slidable sleeve, and an actuating wheel coupled with the said gear wheel for intermittently engaging the dropper rod.

4. In a corn planter, the combination with the frame, the drive axle, the clutch member fixedly mounted on the drive axle, a dropper member, and means for intermittently actuating the dropper member; of a clutch sleeve slidably mounted on the drive axle, marker devices mounted on the sleeve and projected radially therefrom, another sleeve slidably mounted on the drive axle and rotatable therewith, said other sleeve having a slidable coupling connection with the marker carrying clutch sleeve, a gear mounted upon the sliding sleeve, rotatable with the shaft, connected with and adapted for operating the dropper bar actuating means and devices connected with the sleeve that rotates with the shaft for moving the marker out of an operative position when the sleeve is moved in one direction and automatic means for moving the marker to its operative position when said rotatable sleeve is moved in the opposite direction, as set forth.

5. In a corn planter of the character described, the combination with the main frame, the drive axle, the dropper bar rockably mounted upon the frame, means for intermittently rocking said bar and the clutch sleeve fixedly mounted upon the axle; of the clutch sleeve E slidably mounted upon the axle, said sleeve having longitudinal slots E' and one or more radially extended tubular members H, the sleeve F having extensions $f$, slidable in the slots E', said sleeve F being rotatable with the drive axle, lever mechanism for shifting the said sleeve F to turn therewith, said gear being coupled with and adapted to operate the dropper bar actuating devices, the markers slidably mounted in the tubular members H, spring forced outwardly, a flexible connection joined at one end to the inner end of the said markers and at the other end to the sleeve F, substantially as shown and for the purposes described.

6. In a corn planter of the character described, in combination with the drive axle, a clutch member fixedly mounted thereon and a seed dropping mechanism adapted to be intermittnetly actuated; of means for actuating the said seed dropping mechanism, said means engaging the drive sleeve mounted on the axle and coupled with the seed dropping mechanism, the clutch sleeve mounted loosely on the shaft and coöperatively connected with the other sleeve and adapted to be moved into and out of engagement with the fixedly held clutch member by the reverse sliding movements of the sleeve rotatable with the axle, marker devices projected radially from the slidable clutch sleeve, spring forced to their outer or marking position and connections that join with the sleeve mounted to rotate with the axle, and the means adapted for moving the markers to their inner or inoperative position when the sleeve is moved inwardly out of engagement with the clutch member fixed on the shaft, substantially as shown and for the purposes described.

CHARLES W. SPARKS.

Witnesses:
W. H. SLAUGHTER,
J. W. SPARKS.